Dec. 25, 1951     M. R. FENSKE ET AL     2,580,010
PROCESS AND APPARATUS FOR LIQUID-LIQUID EXTRACTION
Filed April 27, 1948     4 Sheets-Sheet 2
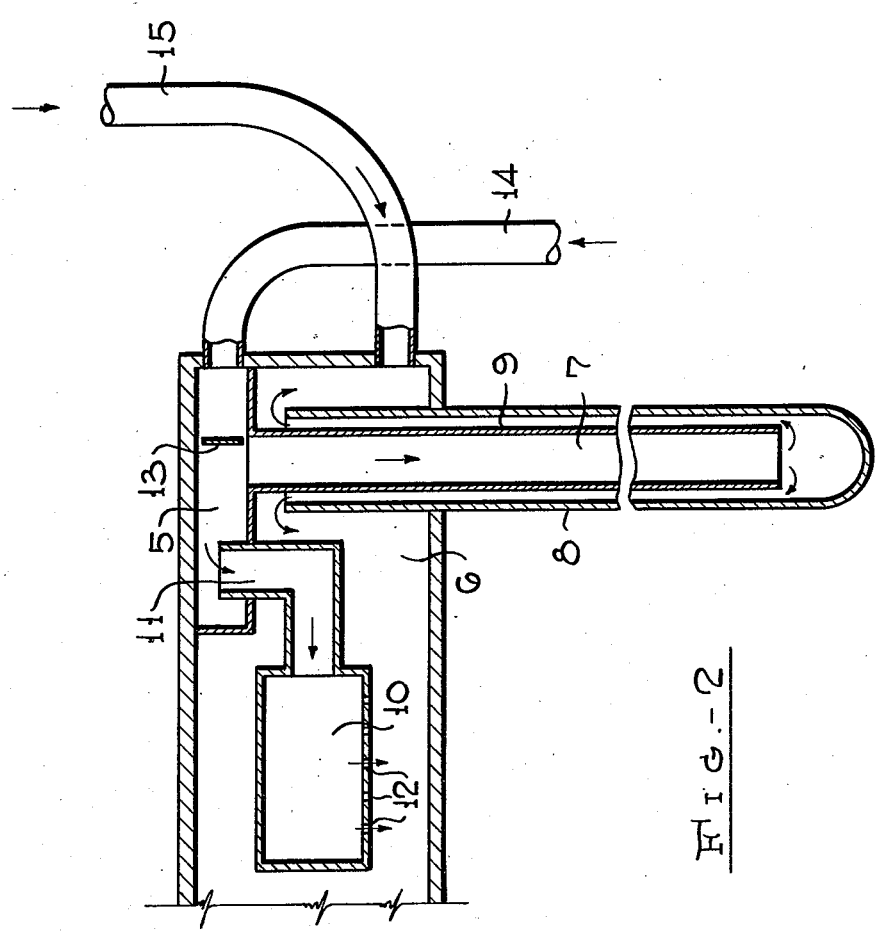
Merrell R. Fenske
Bruce R. Tegge    Inventors
By Henry Bork    Attorney

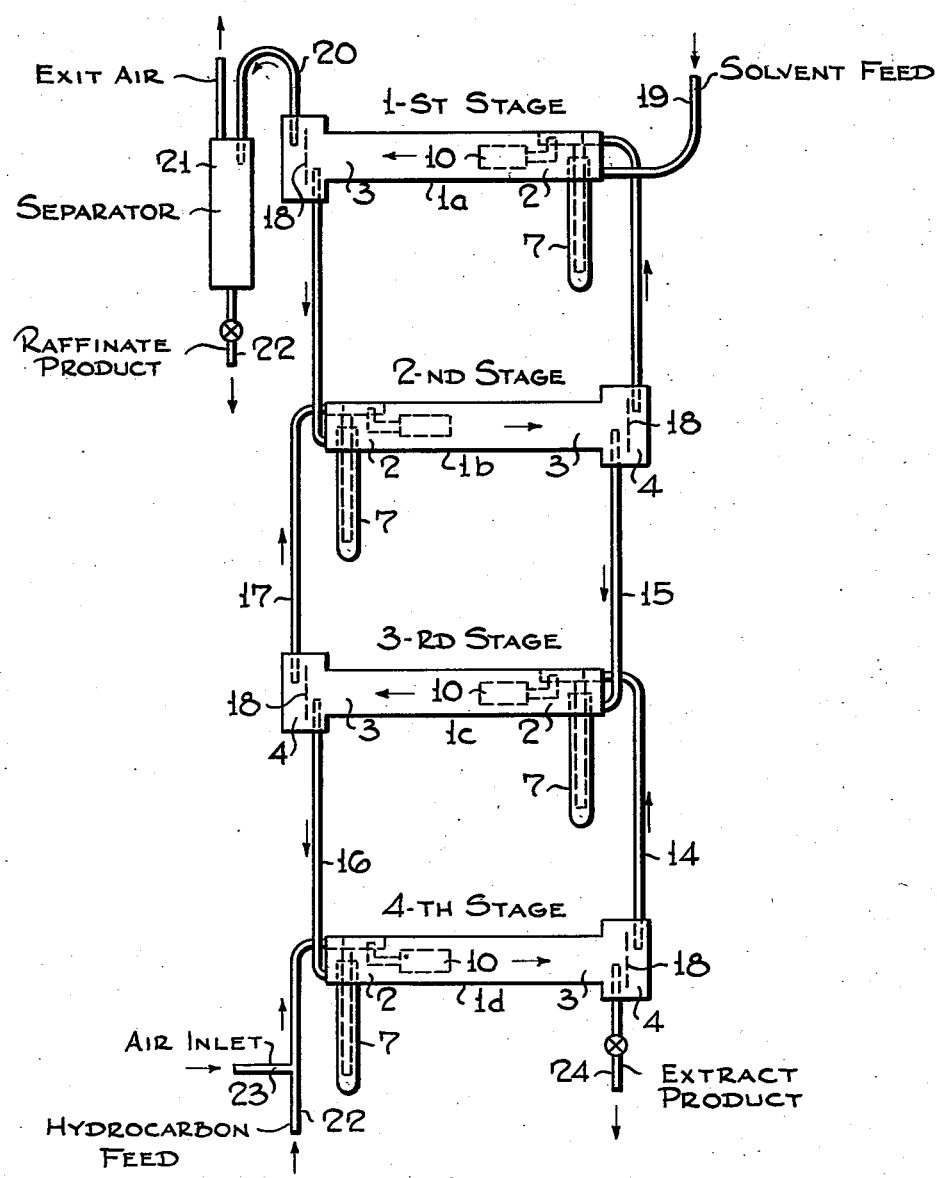

Patented Dec. 25, 1951

2,580,010

UNITED STATES PATENT OFFICE 2,580,010

PROCESS AND APPARATUS FOR LIQUID-LIQUID EXTRACTION

Merrell R. Fenske, State College, and Bruce R. Tegge, Roselle, N. J., assignors to Standard Oil Development Company, a corporation of Delaware Application April 27, 1948, Serial No. 23,446

7 Claims. (Cl. 196—14.49)

This invention relates broadly to the art of treating liquids by contacting them with other liquids, the reagent liquid being to a great degree immiscible or only partly miscible with the treated liquid and differing therefrom in specific gravity in a degree sufficient to permit separation of the two liquids by gravity.

Operations of this general type occur very widely in chemical processes. They are very frequently used in the refining of oils, as for instance, in contacting petroleum distillates with selective solvents, with sulfuric acid, or with alkaline solutions, in the solvent extraction of hydrocarbon mixtures, including naphthas and lubricating oils, products from coal carbonization, synthetic fuels and lubricants, and the separation of chemical mixtures by virtue of differences in solubility of the components of the mixture.

It is the main object of this invention to devise novel process and apparatus whereby and wherein one liquid is treated with another liquid, incompletely miscible therewith, and differing therefrom in specific gravity with maximum economy and efficiency.

The apparatus of the present invention comprises broadly a series of vertically disposed concurrent mixers and settlers in which the mixing of the two liquid phases and the propulsion of one of the phases are brought about by a gas or vapor phase.

More specifically, the apparatus of the present invention consists of a plurality of vertically disposed vessels, each forming a single stage. Each stage contains a mixing zone, a settling zone, and a phase separating zone. Through each of the stages flows a treated liquid or raffinate phase, and a reagent liquid or solvent phase. These phases flow concurrently through the stage, but countercurrently between the stages. Referring to a particular or given stage, the treated liquid from a preceding stage together with reagent liquid from a succeeding stage enter the mixing zone of this particular stage where they are mixed intimately by gas or vapor as they flow together through the mixing zone. They then flow concurrently through the settling zone where the two liquid phases separate or stratify into two liquid phases and a gas or vapor phase. They then flow into the phase separating zone of this particular stage from which the reagent liquid flows to the next preceding stage and the treated liquid to the next succeeding stage. The ends of the apparatus are provided with lines to permit the entrance and withdrawal of the phases. For example, at one end of the apparatus the reagent liquid is usually introduced, and treated liquid is usually withdrawn. At the other end of the apparatus the reagent liquid is usually withdrawn and the treated liquid, or segregated components of it, or another liquid phase incompletely miscible with the reagent phase, is introduced. Usually when the treated liquid is introduced at an intermediate stage then the liquid phase introduced at or near the point of reagent phase withdrawal is a liquid reflux phase. The art and technology of utilizing reflux in liquid-liquid extraction processes is now well established and known.

Each of the mixing zones has an upper and lower chamber interconnected by means for preventing the passage of gas while permitting the passage of liquid. (For example, a dip-leg, a U-tube, or any other liquid sealing device.)

The phase-separating zone in each vessel or stage lies at the opposite end from the mixing zone and is provided with a vertical baffle, on one side of which is provided a pipe for lifting one of the liquids to the next upper vessel (or in case of the uppermost vessel of withdrawing it to storage) and a pipe for withdrawing the other liquid by gravity to the next lower vessel, or, in the case of the lowermost vessel, to a storage tank.

For a more complete understanding of the invention, reference may be had to the accompanying drawings in which:

Figure 2 is a detailed diagrammatic illustration of one of the mixing zones shown in Figure 1.

Figure 4 is a flow diagram of a modification of the apparatus shown in Figure 1

Figure 1:
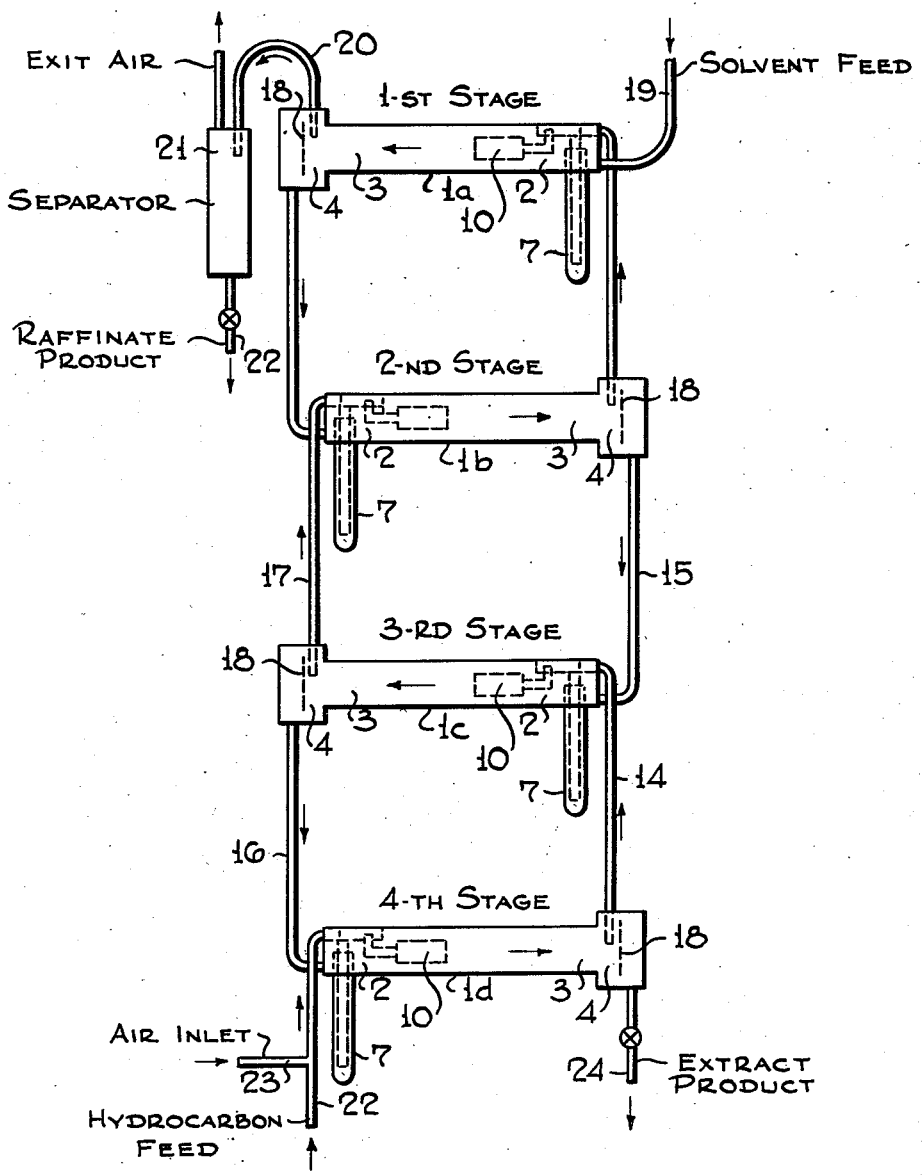
Figure 1 is a flow diagram in elevation of a preferred apparatus for carrying out the process of the present invention.

Referring, therefore, to the drawings there is shown a plurality of extraction vessels $1a$, $1b$, $1c$, and $1d$ mounted vertically one above the other, each consisting of a phase-mixing zone 2, a phase-settling zone 3, and a phase-separating zone 4. Each mixing zone 2 is provided with an upper separation chamber 5, a lower separation chamber 6 communicating therewith through dip leg 7 formed from concentric tubes 8 and 9, and with mixing chamber 10 communicating with upper separation chamber 5 through conduit 11. Chamber 10 is substantially closed with respect to chamber 6 except for orifices 12 provided in the walls thereof. Discharging into upper separation chamber 5 against a baffle 13, is a pipe communicating with the phase-separating zone of the vessel below and discharging into lower separation chamber 6 is a pipe communicating with the phase-separating zone of the vessel above. For example, in vessel 1c, pipe 14 from phase-disengaging zone of vessel 1d communicates with chamber 5 and pipe 15 from the phase-separating zone of vessel 1b communicates with chamber 6.

Each phase-separating zone 4 is provided with an upwardly directed pipe discharging into the mixing zone of the next upper vessel and with a downwardly directed pipe discharging into the mixing zone of the next lower vessel. For example, the separating zone of vessel 1c is provided with pipe 16 discharging into the mixing zone of vessel 1d and pipe 17 discharging into the mixing zone of vessel 1b. Between the upwardly and downwardly directed pipes is placed baffle 18.

The uppermost vessel 1a is provided with feed inlet pipe 19 discharging into the mixing section and with a raffinate phase discharge pipe 20 from the separating zone. Pipe 20 communicates with separator 21 for removing vapor or gas from the raffinate phase or treated liquid which comprise the product.

The lowermost vessel 1d is provided with feed inlet pipes 22 and 23 discharging into the mixing zone and with extract or solvent phase withdrawal pipe 24 from the phase-separating zone.

In operating the above apparatus for the liquid-liquid extraction of mixtures, the liquid to be extracted is thoroughly mixed in each vessel in the mixing zone 2 with a solvent having selective solvent action for one or more of the constituents in the mixture being treated. The mixing is accomplished by bubbling a vapor or inert gas through the solvent or reagent liquid and the mixture or phase being treated. The three-phase mixture thus produced flows concurrently into the settling zone 3 where phase separation or segregation occurs while the mixture is flowing toward the phase-separating zone 4. From the phase-separating zone, the light phase is raised to the mixing zone of the next upper vessel by the gas-lift effect and the pressure of the gas or vapor introduced into the mixing zone, while the heavy phase falls to the mixing zone of the next lower vessel by gravity, the baffle 18 serving to separate the two liquid phases. In this manner the light phase from a lower vessel meets the heavy phase from an upper vessel in the mixing zone where they are again mixed by the gas used to lift the light liquid phase out of the vessel below. The process just outlined is repeated over again in each vessel or stage; namely, the liquid phases are mixed by the gas or vapor, the liquid phases are settled and stratified and then separated so that the light liquid phase is lifted upward by the gas or vapor and the heavy phase flows downward by gravity. In other words, the heavy liquid phase flows downward through all the extraction vessels or stages by the action of gravity, and the light liquid phase is forced upward, from vessel to vessel, by the action of the gas. The same gas, or vapor, entering the lowest vessel usually passes through all the vessels or stages and escapes from the topmost vessel where it can be recompressed to enter the lowest vessel again to repeat the cyclical task of mixing the liquid phases, and then lifting the light liquid phase.

The apparatus will now be described in connection with the extraction of a mixture of normal heptane and methylcyclohexane with aniline as the solvent at 77° F. Referring, therefore, to the drawings, aniline is introduced into the mixing zone 2 of vessel 1a through line 19 while a mixture of normal heptane and methylcyclohexane is introduced into the mixing zone 2 of vessel 1d through line 22. In starting up it is preferable to allow the solvent to collect in the lowest vessel 1d before the hydrocarbon is introduced. Air or other inert gas is then admitted into line 22 through line 23 where it mixes with the hydrocarbon. This mixture is then discharged into separation chamber 5 where it strikes against baffle 13 to cause a separation between the air and the hydrocarbon liquid. The air passes on through chamber 5 and into chamber 10 through line 11, while the hydrocarbon passes downwardly through chamber 7 and upwardly through the space formed by concentric tubes 8 and 9 into chamber 6 where it mixes with aniline and extracted hydrocarbon introduced from the next upper vessel 1c through line 16. This mixture then flows along chamber 6 past the outside of chamber 10 where it is thoroughly mixed by air or gas issuing from orifices 12 in the walls of chamber 10. After being thoroughly mixed with the air, the mixture of solvent and hydrocarbon passes into settling zone 3 where it separates into a light liquid or raffinate phase and heavy liquid or extract phase. The heavy liquid phase settles to the bottom of disengaging zone 4 and is drawn off behind baffle 18 through line 24. The light liquid phase rises to the top of the heavy liquid phase and forms a seal around pipe 14. The air introduced through line 23 then forces the light phase upwardly through pipe 14 into the upper chamber 5 of mixing zone 2 of vessel 1c where it is discharged against baffle 13 and the air separated. The air-free light liquid phase then passes through chamber 7 into lower mixing zone 6 where it contacts heavy liquid extract flowing from stage 1b through pipe 15. This mixture passes by chamber 10 where it is thoroughly mixed by air issuing from orifices 12. The mixture then settles into two phases, the light liquid phase being forced upwardly through pipe 17 to the mixing zone 2 of vessel 1b and the heavy liquid phase falls by gravity through pipe 16 to the mixing zone of vessel 1d. Thus in each vessel or stage, raffinate and extract phases are thoroughly mixed with the air continuously introduced through line 23. The phases flow concurrently through each vessel, at the end of which they are again separated into heavy and light liquid phases, the heavy liquid phase passing by gravity to the next lower vessel and the light liquid phase is forced by the air to the next upper vessel where the same series of operations are repeated. Finally enriched n-heptane is withdrawn from the disengaging zone 4 of vessel 1a through pipe 20. Pipe 20 discharges into separator 21 in order to separate occluded or entrapped air from the product which is withdrawn through line 22. This treated liquid, or raffinate phase, can be led to a fractional distillation column, not shown, where the enriched n-heptane is separated from the solvent, aniline, by distillation. The solvent can then be reintroduced via line 19 to be reused in the process. Similarly, the extract product or solvent phase comprising aniline and dissolved hydrocarbons, partly enriched in methylcyclohexane, are withdrawn through line 24. From here they can proceed to a fractional distillation column which separates the aniline from the dissolved hydrocarbons. The aniline can be reused by feeding it into the apparatus through line 19.

Figure 5:
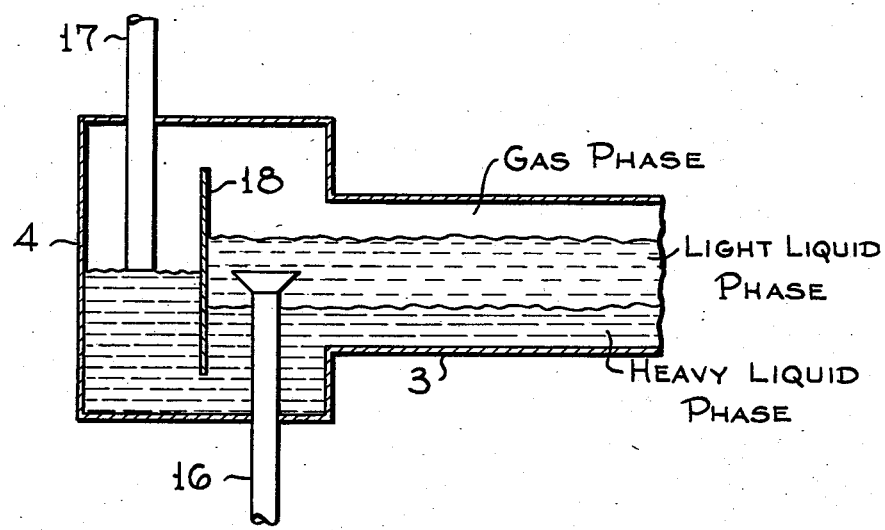
Figure 5 is a detailed diagrammatic illustration of one of the phase-separating zones shown in Figure 4.
Figure 3:
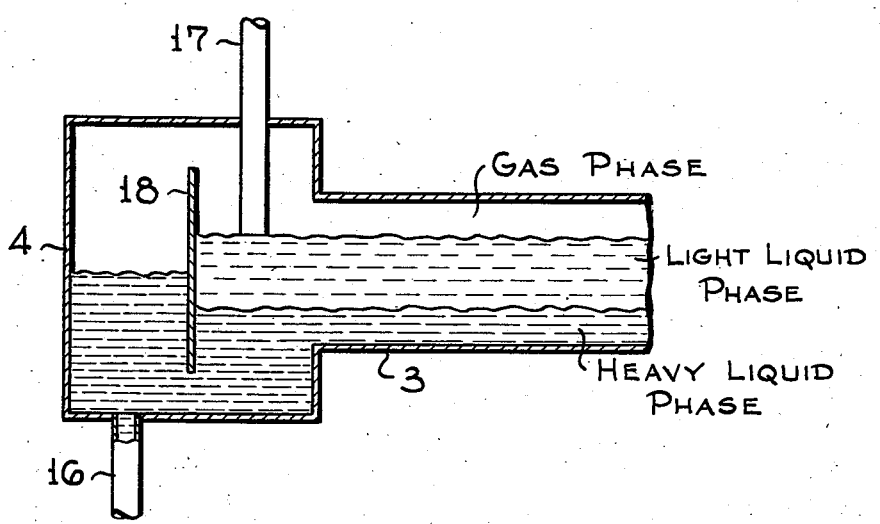
Figure 3 is a detailed diagrammatic illustration of one of the phase-separating zones shown in Figure 1.

In the above description the light liquid phase is carried upward from vessel to vessel by the air lift action, while the heavy liquid phase flows downwardly by the action of gravity. In Figures 4 and 5 are shown a modification of the above described apparatus in which the heavy liquid phase is carried upward by the air lift while the light liquid phase flows downward by gravity. The construction of this apparatus is the same as that shown in Figures 1, 2, and 3, except that the relative positions of gas lift tube and the downcomer in the disengaging zones is reversed. In this case the baffle functions to allow only the heavy liquid phase to enter the space containing the gas lift tube. Otherwise the operation of the apparatus is the same as that described in Figure 1.

In order to show the efficiency of the above described apparatus, the results of fifteen runs on the extraction of a mixture of normal heptane and methyl cyclohexane in the apparatus of Figure 1 are set forth in the following table:

those of interface level control and interstage pumping, common to multiple mixing and settling units when connected to give an overall countercurrent effect, are eliminated. In this respect the gas lift extraction apparatus is comparable to the ordinary liquid-liquid countercurrent column in simplicity of control and operation. However, the throughput capacity of the gas lift liquid-liquid extraction apparatus is considerably greater than a countercurrent liquid-liquid column of similar dimensions.

Instead of using a gas for mixing the two liquid phases and as the means for transporting one of the phases from one stage to another, an essentially saturated vapor may be used. In this case by choosing appropriately the liquid phase that should flow along with the vapor phase, and that which should flow countercurrent to it, the process of distillation or fractional distillation can be realized along with liquid-liquid extraction. For example, the liquid transported upwardly may be that liquid having the highest concentration of the volatile component and the gas used for transporting it contains a substantial proportion of the volatile component in vapor

*Efficiency tests on air lift extraction apparatus*

[Test mixture=methylcyclohexane and n-heptane. Solvent=aniline. Temperature=77° F. Each stage consists of a 12- or 24-inch section of 2-inch Pyrex pipe, 12 inches between stages.]

| Run No. | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Solvent Feed Rate, cu. ft./hr | 1.46 | 0.49 | 0.49 | 3.82 | 3.82 | 4.01 | 3.85 | 3.65 | 3.65 | 4.05 | 3.81 | 5.94 | 3.52 | 3.52 | 1.48 |
| Solvent Feed Rate, lbs./hr | 89.2 | 29.6 | 29.6 | 232.5 | 232.5 | 244.5 | 232 | 221.5 | 222 | 248 | 232 | 362 | 216 | 216 | 91.4 |
| Hydrocarbon Feed Rate, cu. ft./hr | 0.246 | 0.082 | 0.083 | 1.42 | 1.42 | 1.40 | 1.40 | 0.76 | 0.75 | 1.42 | 1.42 | 1.42 | 0.89 | 0.89 | 0.40 |
| Hydrocarbon Feed Rate, lbs./hr | 11.9 | 3.96 | 4.00 | 67.3 | 67.3 | 66.9 | 66.9 | 36.4 | 35.4 | 67.4 | 67.4 | 67.4 | 40.0 | 40.0 | 18.0 |
| Extract Product Rate, cu. ft./hr | 1.52 | 0.51 | 0.51 | 3.93 | 3.93 | 4.20 | 3.96 | 3.76 | 3.77 | 4.24 | 3.96 | 6.04 | 3.58 | 3.57 | 1.51 |
| Extract Product Rate, lbs./hr | 92.5 | 30.7 | 30.7 | 239.5 | 238.5 | 254 | 239.5 | 227.5 | 229 | 258 | 240 | 370 | 219 | 218 | 92.6 |
| Raffinate Product Rate, cu. ft./hr | 0.179 | 0.060 | 0.060 | 1.27 | 1.30 | 1.22 | 1.26 | 0.64 | 0.62 | 1.24 | 1.27 | 1.27 | 0.83 | 0.84 | 0.38 |
| Raffinate Product Rate, lbs./hr | 8.4 | 2.83 | 2.84 | 60.3 | 61.3 | 57.3 | 59.4 | 30.6 | 28.8 | 58.1 | 59.5 | 59.5 | 36.8 | 37.5 | 16.8 |
| Solvent-to-Oil Ratio (by t.) | 7.50 | 7.47 | 7.40 | 3.46 | 3.46 | 3.67 | 3.47 | 6.08 | 6.28 | 3.69 | 3.45 | 5.40 | 5.40 | 5.10 |
| Extract-to-Raffinate Ratio (by wt.) | 11.0 | 10.9 | 10.8 | 3.98 | 3.89 | 4.42 | 4.03 | 7.41 | 7.95 | 4.43 | 4.04 | 6.22 | 5.95 | 5.82 | 5.52 |
| Solvent Phase Velocity, ft./sec | 0.143 | 0.047 | 0.047 | 0.374 | 0.374 | 0.393 | 0.374 | 0.357 | 0.357 | 0.397 | 0.372 | 0.322 | 0.345 | 0.345 | 0.145 |
| Solvent Phase Reynolds Number | 310 | 140 | 140 | 1110 | 1110 | 1160 | 1110 | 1060 | 1060 | 1170 | 1100 | 925 | 1020 | 1020 | 320 |
| Hydrocarbon Phase Velocity, ft./sec | 0.006 | 0.002 | 0.002 | 0.034 | 0.034 | 0.034 | 0.034 | 0.019 | 0.018 | 0.034 | 0.034 | 0.039 | 0.021 | 0.021 | 0.010 |
| Hydrocarbon Phase Reynolds No | 200 | 65 | 65 | 1110 | 1110 | 1110 | 1110 | 605 | 590 | 1110 | 1110 | 1285 | 695 | 695 | 310 |
| Feet Air Rate, cu. ft./hr | 6.6 | 9.6 | 15.0 | 23.4 | 6.0 | 22.8 | 7.4 | 6.3 | 22.8 | 24.0 | 5.4 | 5.9 | 25.8 | 5.6 | 5.6 |
| Cu. Ft. of Air/Cu. Ft. of Liquid | 3.9 | 16.8 | 26.3 | 4.4 | 1.2 | 4.2 | 1.4 | 1.4 | 5.2 | 4.3 | 1.0 | 0.8 | 5.8 | 1.3 | 3.0 |
| Length of Air Mixing Section, in | 5.5 | 5.5 | 5.5 | 5.5 | 5.5 | 14 | 14 | 14 | 14 | 14 | 14 | 14 | 14 | 14 | 14 |
| Length of Settling Section, in | 6.5 | 6.5 | 6.5 | 6.5 | 6.5 | 10 | 10 | 10 | 10 | 10 | 10 | 10 | 10 | 10 | 10 |
| No. of 1/32-In. Holes in Air Mixer | 16 | 16 | 16 | 16 | 16 | 40 | 40 | 40 | 40 | 16 | 16 | 16 | 40 | 40 | 40 |
| Feed and Product Compositions:[1] | | | | | | | | | | | | | | | |
| Solvent Feed | 66.2 | 66.2 | 66.2 | 66.3 | 66.3 | 59.7 | 59.7 | 59.7 | 59.7 | 49.2 | 49.2 | 49.2 | 9.7 | 9.7 | 9.7 |
| Hydrocarbon Feed | 86.8 | 86.8 | 86.8 | 79.2 | 79.2 | 80.8 | 80.8 | 80.8 | 80.8 | 72.4 | 72.4 | 72.4 | 30.5 | 30.5 | 30.5 |
| Extract Product | 84.0 | 85.6 | 86.3 | 80.2 | 77.9 | 81.0 | 78.9 | 75.9 | 77.4 | 72.9 | 68.4 | 63.0 | 32.6 | 27.5 | 30.3 |
| Raffinate Product | 66.3 | 63.6 | 63.4 | 71.5 | 72.8 | 70.4 | 72.6 | 68.7 | 66.3 | 61.6 | 63.9 | 63.6 | 20.7 | 23.5 | 22.5 |
| Number of Actual Stages | 4 | 4 | 4 | 2 | 2 | 2 | 2 | 2 | 2 | 2 | 2 | 2 | 2 | 2 | 2 |
| Number of Theoretical Stages | 2.20 | 3.23 | 3.55 | 1.16 | 0.79 | 1.32 | 0.92 | 0.94 | 1.23 | 1.19 | 0.73 | 0.59 | 1.29 | 0.72 | 0.94 |
| Efficiency Per Stage, Per Cent | 55 | 80.7 | 88.7 | 58 | 39.5 | 66 | 46 | 47 | 61.5 | 59.5 | 36.5 | 29.5 | 64.5 | 36 | 47 |

[1] Weight per cent methylcyclohexane, solvent-free, all phases saturated.

In the above table, runs 1, 2 and 3 were made in a four-stage system and show that stage efficiency is independent of the number of actual stages used.

Runs 6 and 7 show that an increase in stage efficiency is obtained by increasing the length and number of air orifices in mixer 10 as compared with runs 4 and 5 at maximum and minimum air rates, respectively. A comparison of runs 5 and 6 shows likewise that an increase in stage efficiency can be realized by increasing the number of orifices while maintaining a constant air rate per orifice.

The effect of air or gas rate on stage efficiency is very pronounced and is shown by comparing run 2 with run 3, run 4 with run 5, run 6 with run 10, run 8 with run 9, run 10 with run 11 and run 13 with run 14. In each case the efficiency is increased with increased air rate.

The gas lift extraction apparatus embodies many of the desirable features of the concurrent mixing and settling units. In addition many of the difficulties frequently encountered, such as form. This process is particularly applicable where one or more of the materials have appreciable vapor pressures, and where there is a useful concentration difference between the vapor and liquid phases that can be employed to produce the separation of one or more of the components of the mixture being treated.

The apparatus can be operated at any desired pressure and the pressure of the gas or vapor may vary through wide limits. Solvents having appreciable vapor pressure, such as liquid sulfur dioxide and ammonia, can be employed, and their partial pressure may be any proportion of the total pressure. For example, if the apparatus is employed with liquid sulfur dioxide as the solvent where the vapor pressure of sulfur dioxide is 50 pounds per sq. in., the vapors causing the mixing and the transport of one of the phases may be essentially pure sulfur dioxide, if the total pressure on the apparatus is around 50 p. s. i. and if the material being extracted has a low vapor pressure in comparison with liquid sulfur dioxide. Or the total pressure on the apparatus may be increased to 100 p. s. i. (or more) by using an inert gas such as nitrogen or carbon dioxide to increase the total pressure and enhance the mixing of the phases and the transport of one of them. In this case, the gas phase in the unit will be composed approximately of 50 mole per cent sulfur dioxide and 50 mole per cent inert gas.

Various temperatures may be employed. The temperatures in the various stages may be the same or different. In many cases, temperature gradients are useful. This is particularly true when the mixture to be extracted is fed to the apparatus at an intermediate stage, so the apparatus functions both as a stripping and an enriching unit. The stripping section is usually those stages between the point of feed entry and solvent entry. The enriching section usually comprises those stages between the point of feed entry and solvent egress. In this type of operation it is usually desirable to decrease the temperature in the direction of solvent flow, and temperatures in the stripping section are usually higher than in the enriching section. Temperature control can be accomplished by placing cooling or heating coils or tubes in the mixing or settling zones of the stages, or in the lines between the stages through which light phase and heavy phase are flowing.

Anti-solvents, i. e. materials soluble in the main solvent but capable of reducing its dissolving power, may be added at one or more stages. These may be added in the mixing or settling zones or in the solvent line connecting the stages. Anti-solvents are useful for maintaining the concentration of material dissolved in the solvent at a value which will give the optimum selectivity of the solvent for the components or groups of components being extracted.

The mixing element in the mixing zones may take a variety of forms. These elements may be a cylinder or tubes having small holes through which the gas or vapors emerge to mix the phases surrounding the cylinder or tubes. Or they may be slotted caps or tubes, with the gas for mixing emerging from the slots. The mixing elements should be so placed and designed that there is little opportunity for the liquid phase to by-pass them or to flow through the mixing zone without being mixed. To enhance the mixing, baffles and other phase contacting means such as Raschig rings or the equivalent can be placed in the mixing zone.

The settling zone may also be provided with decks or trays to enhance the settling and reduce entrainment.

Various means may be employed to reintroduce into the bottom of the extractor the gas or vapor leaving the top of the extractor. When the gas is not seriously contaminated with components of the material being extracted or with solvent, it may be repressured by a pump, blower, or other equivalent device, and reintroduced into the extractor. When unwanted components are present in the gas these can be removed by scrubbing or washing the gas with a suitable absorbent for the components before the gas is returned to the extractor. In some cases adsorbents might be useful to recondition the gas. These comprise silica gel, charcoal, clays, etc.

Instead of using a gas that is relatively noncondensable, gases relatively easily liquefiable may be employed. In this case the gas, instead of being compressed, can be led to a condenser to liquefy it. From here the liquefied gas can be led to a vaporizer where the proper proportions of vapor are fed to the extractor. While in the liquid state, the material may be purified or otherwise conditioned for use in the extractor. Examples of materials that are relatively easily liquefied and suitable are trichlorofluoromethane, dichlorodifluoroethylene, the chlorofluoro-ethanes, -propanes, and -propylenes, sulfur dioxide, methylamine, and hydrocarbons having 4 or 5 carbon atoms. These materials may not all be suitable for every type of material being extracted, but the proper selection can be made easily using known principles of solubility in the liquid phases, chemical reactivity with the materials in the extractor, availability, etc.

Another means for obviating the use of a gas compressor is to employ a gas that is quite soluble in a common solvent. Then the solution can be heated to generate the gas in any desired proportion. An example of this is gaseous ammonia, and its absorption in water, and its regeneration by heating the solution.

The nature and objects of the present invention having been thus set forth and specific examples of the same given, what is claimed as new and useful and desired to be secured by Letters Patent is:

1. A process for contacting a liquid with another liquid incompletely miscible therewith which comprises flowing one of said liquids downwardly and the other of said liquids upwardly through a plurality of stages, each stage having a mixing zone, a settling zone, and a separating zone adjacent thereto and essentially on the same level, effecting contact of said liquids in each of said mixing zones by means of a gas, concurrently flowing said mixture of liquids and gas from each mixing zone into the adjacent settling zone, effecting separation of said mixture into two liquid phases and a gas phase, concurrently flowing said phases from each settling zone into the adjacent separating zone, flowing one of said liquid phases downwardly from the separating zone of each stage into the mixing zone of the stage next below, flowing the other liquid phase from the separating zone of each stage into the mixing zone of the next stage above, adding in said last named mixing zone said liquid thus upwardly flowed to the liquid flowing down from the next above separating zone, effecting the upward flow of other said liquid by means of substantially all of the said gas phase, separating the gas from the liquid thus upwardly transported and introducing this gas into the said two liquids to effect the mixing thereof.

2. Process according to claim 1 in which the gas contains a substantial proportion of vapors.

3. Process of claim 1 in which the gas contains a substantial proportion of vapors of at least one of the liquid components flowing through each stage and the liquid phase having the highest concentration of the volatile component is the liquid that is transported upwardly through the stages by the gas-vapor mixture.

4. Process of claim 1 in which the gas is removed from the last stage, freed substantially of components undergoing treatment and reintroduced into the first stage.

5. A process for the extraction of a liquid with a solvent incompletely miscible therewith which comprises flowing said liquid downwardly and the said solvent upwardly through a plurality of stages, each stage having a mixing zone, a settling zone, and a separating zone adjacent thereto and essentially on the same level, effecting contact of said liquid with said solvent in each of said mixing zones by means of a gas, concurrently flowing said mixture of liquid, solvent and gas from each mixing zone into the adjacent settling zone, effecting separation of said mixture into a liquid raffinate phase, a liquid solvent phase, and a gas phase, concurrently flowing said phases from each settling zone into the adjacent separating zone, flowing said liquid raffinate phase downwardly from the separating zone of each stage into the mixing zone of the next stage below, flowing the same solvent phase from the separating zone of each stage into the mixing zone of the next stage above, adding said liquid solvent phase thus upwardly flowed to the liquid raffinate phase flowing down from the next above separating zone, effecting the upward flow of said solvent phase by means of the said gas phase, separating the gas phase from the liquid thus upwardly transported and introducing this gas phase into the solvent and raffinate phases to effect the mixing thereof.

6. A process for the extraction of a liquid with a solvent incompletely miscible therewith which comprises flowing said liquid upwardly and the said solvent downwardly through a plurality of stages, each stage having a mixing zone, a settling zone, and a separating zone adjacent thereto and essentially on the same level, effecting contact of said liquid with said solvent in each of said mixing zones by means of a gas, concurrently flowing said mixture of said liquid, solvent and gas from each mixing zone into the adjacent settling zone effecting separation of said mixture into a liquid raffinate phase, a liquid solvent phase, and a gas phase, concurrently flowing said phases from each settling zone into the adjacent separating zone, flowing said liquid raffinate phase upwardly from the separating zone of each stage into the mixing zone of the stage next above, flowing the said solvent phase from the separating zone of each stage downwardly into the mixing zone of the next stage below, adding the said raffinate phase thus upwardly flowed to the solvent phase flowing down from the next above separating zone, effecting the upward flow of said raffinate phase by means of the said gas phase, separating the gas phase from the raffinate thus upwardly transported and introducing this gas phase into the raffinate and solvent to effect the mixing thereof.

7. A liquid-liquid extraction apparatus comprising a plurality of vertically aligned, horizontally disposed vessels, an upper chamber in each vessel, a lower chamber in each vessel, a separating zone in one end of said lower chamber, gas sealing means between said upper and said lower chambers, an enclosed chamber within said lower chamber, communicating directly with said upper chamber, said enclosing chamber communicating with said lower chamber through small orifices in the walls thereof, means connecting adjacent vessels for conducting raffinate from the separating zone of one vessel to the upper chamber of the next higher vessel, means connecting adjacent vessels for conducting extract from the separation zone of one vessel to the lower chamber of the next lower vessel, means for introducing material to be treated into the upper chamber of the lowermost vessel, means for withdrawing raffinate from the uppermost vessel, means for introducing fresh solvent to the lower chamber of the uppermost vessel, and means for withdrawing extract from the lowermost vessel.

MERRELL R. FENSKE.
BRUCE R. TEGGE.

REFERENCES CITED

The following references are of record in the file of this patent:

UNITED STATES PATENTS

| Number | Name | Date |
| --- | --- | --- |
| 1,616,209 | Weisgerber | Feb. 1, 1927 |
| 1,864,911 | Jodeck | June 28, 1932 |
| 1,951,787 | Child et al. | Mar. 20, 1934 |
| 2,076,126 | Guinot | Apr. 6, 1937 |
| 2,257,283 | Snow | Sept. 30, 1941 |
| 2,361,780 | Lewis | Oct. 31, 1944 |

FOREIGN PATENTS

| Number | Country | Date |
| --- | --- | --- |
| 307,823 | Great Britain | May 30, 1929 |